United States Patent [19]

Krebs et al.

[11] Patent Number: 4,967,603
[45] Date of Patent: Nov. 6, 1990

[54] INDUCTIVE FLOW PROBE FOR MEASURING THE FLOW VELOCITY OF A STREAM OF LIQUID METAL

[75] Inventors: Lambert Krebs, Stutenese, Fed. Rep. of Germany; Sandor Horanyi, Budapest, Hungary

[73] Assignee: Kernforschungszentrum Karlsruhe GmbH, Karlsruhe, Fed. Rep. of Germany

[21] Appl. No.: 257,700

[22] Filed: Oct. 14, 1988

[30] Foreign Application Priority Data

Oct. 15, 1987 [DE] Fed. Rep. of Germany ....... 3734912

[51] Int. Cl.$^5$ .............................................. G01F 1/58
[52] U.S. Cl. .............................. 73/861.02; 73/861.13; 73/861.15; 376/246
[58] Field of Search ........... 73/861.01, 861.02, 861.03, 73/861.08, 861.11, 861.13, 861.15, 861.12, DIG. 3; 374/139; 376/246, 247

[56] References Cited

U.S. PATENT DOCUMENTS

| | | | |
|---|---|---|---|
| 3,701,280 | 10/1972 | Stroman | 73/861.03 |
| 3,736,798 | 6/1973 | Wood et al. | 73/861.13 |
| 3,824,456 | 7/1974 | Wiegand | 73/861.11 |
| 4,008,609 | 2/1977 | Lambrecht et al. | 73/861.13 |
| 4,033,830 | 7/1977 | Fletcher, III | 73/861.02 |
| 4,145,924 | 3/1979 | Müller | |
| 4,622,202 | 11/1986 | Yamada et al. | 73/861.11 |
| 4,768,384 | 9/1988 | Flecken et al. | 73/861.02 |

OTHER PUBLICATIONS

"Permanent Magnet Flow Measuring Probe for Liquid Metals", St. Müller, G. Thun, Kernforschungszentrum Karlsruhe, 11/77.
"Turbulent Heat Transport in Liquid Sodium", Thomas von Weissenfluh, ETH Zürich (1984), Diss. ETH No. 7464.

Primary Examiner—Joseph A. Orsino
Assistant Examiner—Brent A. Swarthout
Attorney, Agent, or Firm—Spencer & Frank

[57] ABSTRACT

An inductive flow probe for measuring the flow velocity of a stream of liquid metal by insertion of the probe into the stream. The probe includes a probe tube having first and second regions therein, at least one permanent magnet disposed in the first region for providing a magnetic field with a direction substantially transverse to the direction of the stream, and a first pair of thermoelements positioned in the first region within the magnetic field. The invention further includes a second pair of thermoelements positioned in the second region outside the magnetic field and an evaluation circuit coupled to the first and second pairs of thermoelements. The evaluation circuit generates a temperature-compensated signal corresponding to the velocity of the stream of liquid metal.

12 Claims, 10 Drawing Sheets

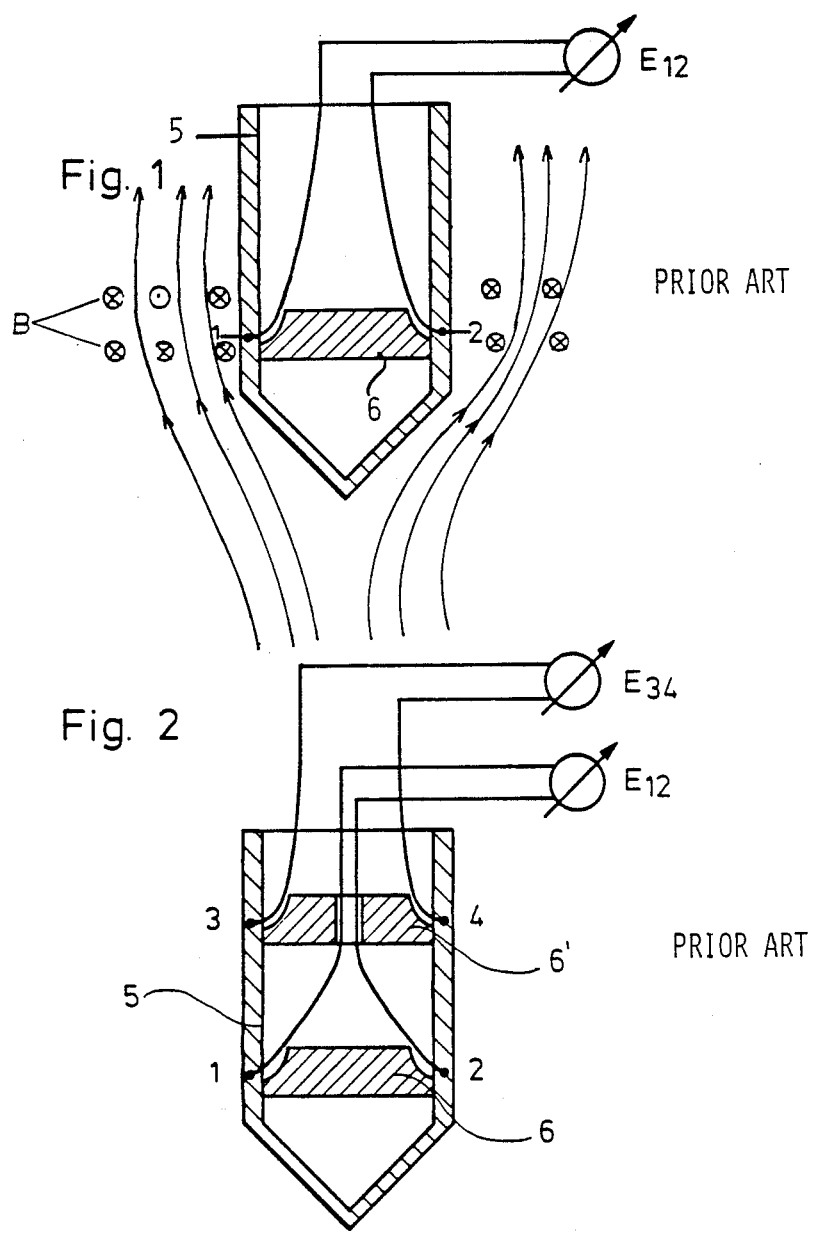

PRIOR ART

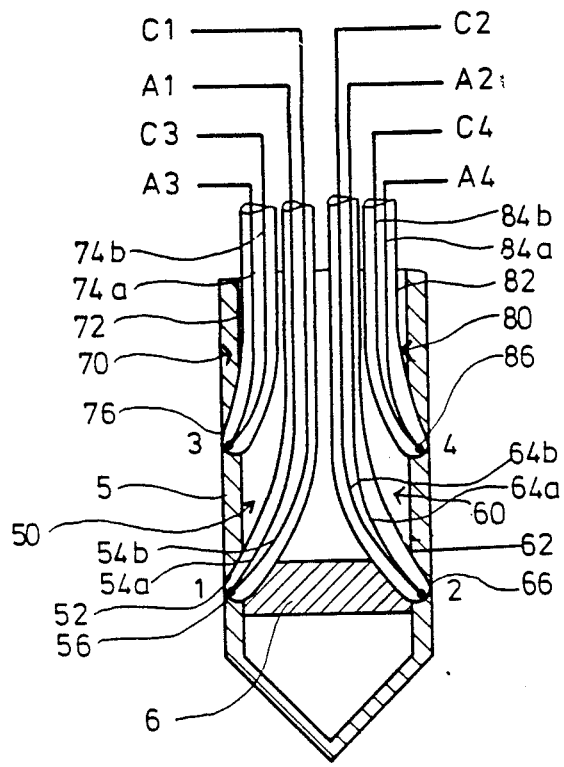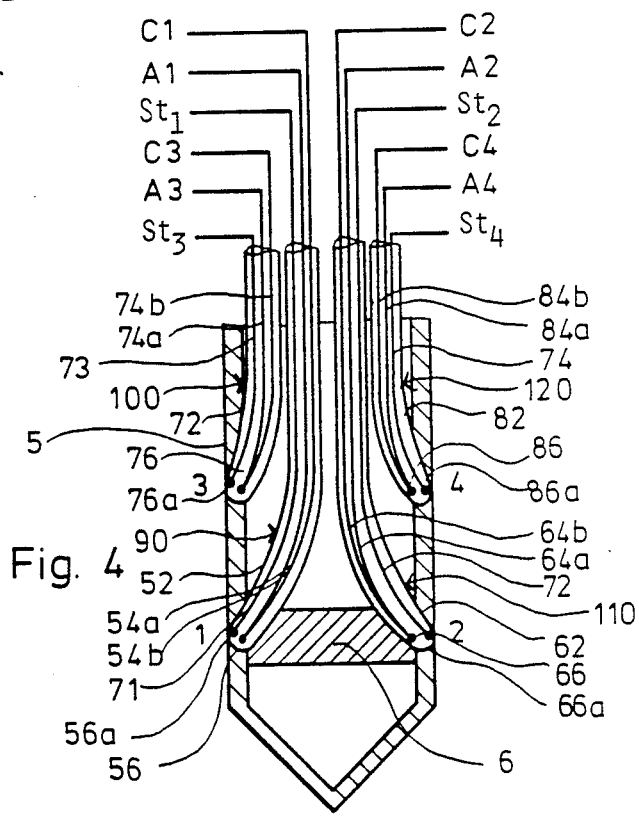
Fig. 3
Fig. 4

INDUCTIVE FLOW PROBE FOR MEASURING THE FLOW VELOCITY OF A STREAM OF LIQUID METAL

BACKGROUND OF THE INVENTION

Field of the Invention

The present invention relates to an inductive flow probe for measuring the local flow velocity of a stream of liquid metal.

An inductive flow probe comprises a tube, for insertion into a stream of liquid metal, which is closed at one end and contains at least one permanent magnet disposed within the tube. A magnetic field having a direction transverse to the major flow direction of the liquid metal is generated by the magnet, and a pair of thermoelements is positioned within the magnetic field. An evaluation circuit is connected to the probe for determining the velocity of the liquid metal. One such system is disclosed in U.S. Pat. No. 4,145,924.

Probes of this type are used to measure local velocities in liquid metals as, for example, in the circulation of a sodium cooled nuclear reactor, particularly in the area of the fuel elements so as to constantly monitor the stream of liquid metal and avoid local overheating.

A permanent-magnet velocity measuring probe for liquid metals is shown in FIGS. 1 and 1a, which comprises a tube 5 and permanent magnet 6. This measuring probe 5 operates according to Faraday's principle of induction. That is, if an electrically conductive liquid flows through a magnetic field in a flow direction (indicated by arrows A) which is different from the direction of the magnetic field, an electric field is generated in the liquid. A measured difference in electrical potential $E_{12}$ between two points 1 and 2 of the electric field is proportional to the flow velocity V, and the following equation applies:

$$E_{12} = C_1(B \cdot V)$$

where $C_1$ is a proportionality constant which depends on the properties of the materials involved and on the geometry of the arrangement and which, in a specific case, must be determined by calibration.

The calibration can also be made after the probe has been installed at its point of use if, instead of one permanent magnet 6, two or more permanent magnets 6 and 6' are arranged in the direction of flow as shown in FIG. 2. In this arrangement, the transit time $\tau_m$ of any fluctuations in the velocity between the two magnets 6 and 6' may be determined by a correlation of the associated probe signals at points 1, 2, 3 and 4 and from this, if the distance between the magnets 6 and 6' is known, the average flow velocity can be determined.

The embodiment shown in FIG. 2 which employs two or more magnets 6 and 6' is advantageous in that changes in the magnetic field intensity as a result of temperature influences, irradiation or aging, and thus changes in the measured voltage can be eliminated by using the described calibration method.

Details of the structure and operation of such probes were published in a report by Kernforschungszentrum Karlsruhe (St. Müller, G. Thun, "Permanentmagnetische Durchflussmeβsonde für flüssige Metalle" which translates to "Permanent-Magnet Flow Measuring Probe For Liquid Metals"). In the permanent magnetic flow velocity measuring probe described in this article, two steel wires are employed as the measuring electrodes to pick up locally the potential difference induced by the flow velocity.

One of the problems with the probes of the prior art is that an assumption is necessary. With the probes of the prior art, one must assume that no temperature difference exists between the measuring electrodes, i.e. no temperature gradients exist in the stream, so that the probe signal changes in proportion to the flow velocity. If this assumption is not met, such as in streams flowing through channels with heated walls or in streams that flow upwardly, a temperature component is superimposed on the probe signal in addition to the velocity component. This temperature component corresponds to the difference in thermoelectric potential between the two ends of the measuring electrodes and may be greater by some multiple than the velocity signal. Since the temperature difference between the two pickup points cannot be measured, the temperature component in this type of probe configuration cannot be compensated.

One solution for the previously noted problem is discussed in a dissertation by T. von Weissenfluh, entitled "Turbulenter Wärmetransport in flüssigem Natrium" which translates to "Turbulent Heat Transport in Liquid Sodium", ETH Zürich (1984), Diss. ETH No. 7464. Von Weissenfluh discloses a permanent-magnet velocity measuring device in which the temperature difference between the potential pickup points can be measured in addition to the velocity component by using pickup electrodes comprising open Cromel/Alumel thermoelements. Although this makes it possible in principle to obtain temperature compensation for the probe signal, it requires an accurate knowledge of the Seebeck coefficients of the measuring electrode material (i.e., Cromel and Alumel) and of the liquid metal (e.g. sodium). Since Seebeck coefficients depend on absolute temperature, this dependency must also be considered when obtaining a temperature compensation value for the probe signal. Thus, a problem with this probe is that continuous compensation of the probe signal requires, in addition to measuring the temperature difference between the measuring electrodes, a constant indirect measurement of a physical parameter i.e., the Seebeck coefficients of at least the electrode material and the liquid metal.

SUMMARY OF THE INVENTION

It is an object of the present invention to provide an improved probe wherein the influence of the temperature gradient in the stream is minimized or eliminated. This is accomplished by providing an inductive flow probe with at least one additional pair of thermoelements disposed in the probe tube in a region which is not influenced by the magnetic field of the permanent magnet.

More specifically an inductive flow probe is provided for measuring the flow velocity of a stream of liquid metal by insertion of the probe into the stream. The probe includes a probe tube having first and second regions therein, at least one permanent magnet disposed in the first region for providing a magnetic field having a direction substantially transverse to the direction of the stream, and a first pair of thermoelements positioned in the first region within the magnetic field. Additionally, there is at least a second pair of thermoelements positioned in the second region outside the magnetic field and an evaluation circuit coupled to the first and second pairs of thermoelements. The evaluation circuit generates a temperature-compensated signal corresponding to the velocity of the stream of liquid metal.

BRIEF DESCRIPTION OF THE DRAWINGS

FIG. 1 is an axial sectional view of a prior art permanent magnet velocity measuring probe for use with liquid metals.

FIG. 2 is an axial sectional view of a prior art measuring probe employing two magnets.

FIG. 3 is an axial sectional view of a permanent magnetic velocity measuring probe according to the invention.

FIG. 4 is an axial sectional view of another measuring probe according to the invention.

DESCRIPTION OF THE PREFERRED EMBODIMENTS

Figure 1A:
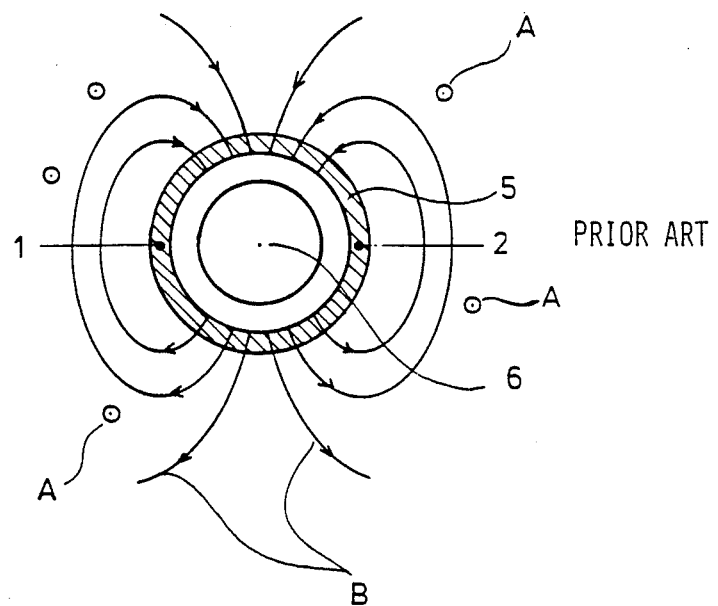
FIG. 1a is a top view of a prior art permanent magnet velocity measuring probe for use with liquid metals.

Referring to FIG. 3, a first thermoelement 50 is provided which comprises a jacket 52 containing an Alumel tipped lead 54a and a Cromel tipped lead 54b forming an Alumel/Cromel measuring head 56 attached at point 1 to a tube 5. Similarly, a second thermoelement 60 is provided which comprises a jacket 62 containing an Alumel tipped lead 64a and a Cromel tipped lead 64b forming an Alumel/Cromel measuring head 66 attached at point 2 to the tube 5. Leads 54a and 54b are connected respectively to terminals $A_1$ and $C_1$, and leads 64a and 64b are connected respectively to terminals $A_2$ and $C_2$. Disposed within the probe tube 5 adjacent points 1 and 2 is the disc-shaped magnet 6.

In a second region of the probe tube 5, external to the magnetic field generated by magnet 6, is a second pair of thermoelements 70, 80. The third thermoelement 70 has a jacket 72 containing an Alumel tipped lead 74a and a Cromel tipped lead 74b forming an Alumel/Cromel measuring head 76 attached at point 3. Similarly, the fourth thermoelement 80 is provided with a jacket 82 containing an Alumel tipped lead 84a and a Cromel tipped lead 84b forming a measuring head 86 attached at point 4. Leads 74a and 74b are connected respectively to terminals $A_3$ and $C_3$, and leads 84a and 84b are connected respectively to terminals $A_4$ and $C_4$. One Alumel/Cromel measuring head in each pair 56, 66 and 76, 86 is grounded for picking up the probe signals.

Referring to FIG. 4, a second embodiment of the probe tube 5 is illustrated. In this embodiment, steel wires 71, 72, 73 and 74 are disposed in and welded to each of the respective jackets 52, 62, 72, 82 at the measuring heads. These triple-conductor thermoelements 90, 100, 110, 120 have insulated Alumel/Cromel measuring heads and the added steel wires for measuring the temperature and for picking up the probe signals.

Thermoelement 90 comprises a jacket 52 containing an Alumel tipped lead 54a and a Cromel tipped lead 54b forming a measuring head 56 attached at point 1 to the tube 5. Also, in the jacket 52 is the steel wire 71 which is attached to the tube 5 and forms a measuring head 56a. Similarly, thermoelement 110 is provided which comprises a jacket 62 containing an Alumel tipped lead 64a and a Cromel tipped lead 64b forming a measuring head 66 attached at point 2 to the tube 5 and the steel wire 72 forming measuring head 66a. Leads 54a and 54b are connected respectively to terminals $A_1$ and $C_1$, leads 64a and 64b are connected respectively to terminals $A_2$ and $C_2$ and wires 71 and 72 are connected to terminals $St_1$ and $St_2$. Disposed within the probe tube 5 adjacent points 1 and 2 is the disc-shaped magnet 6.

In the second region of the probe tube 5, external to the magnetic field generated by magnet 6, is the pair of thermoelements 100, 120. The thermoelement 100 has a jacket 72 containing an Alumel tipped lead 74a and a Cromel tipped lead 74b forming a measuring head 76 attached at point 3 to the tube 5 and the steel wire 73 forming a measuring head 76a. Similarly, the thermoelement 120 is provided with a jacket 82 containing an Alumel tipped lead 84a and a Cromel tipped lead 84b forming a measuring head 86 attached at point 4 to the tube 5 and the steel wire 74 forming a measuring head 86a. Leads 74a and 74b are connected respectively to terminals $A_3$ and $C_3$, leads 84a and 84b are connected respectively to terminals $A_4$ and $C_4$, and wires 73 and 74 are connected to terminals $St_3$ and $St_4$.

The arrangements shown in FIGS. 3 and 4 make it possible to realize substantially complete temperature compensation by measuring two potential differences and four temperatures.

The following terminology will be employed hereinafter:

U = measured signal voltage;
E = velocity component in the signal voltage;
$\Delta T$ = temperature difference between measuring points;
S = Seebeck coefficient;
C* = non-dimensional proportionality constant;
A = Alumel electrode;
C = Cromel electrode;
N = liquid metal (e.g., sodium);
St = steel electrode;
1, 2, 3, 4 = measuring location points.

The potential differences between the electrode pickups at measuring location points 2 and 1 in the probe embodiment shown in FIG. 3 is:

$$U_{21A} = E_{21} + \Delta T_{21}(S_N - S_A) \tag{1}$$

$$U_{21C} = E_{21} + \Delta T_{21}(S_N - S_C) \tag{2}$$

and for the embodiment employing triple-conductor thermoelements as shown in FIG. 4:

$$U_{21St} = E_{21} + \Delta T_{21}(S_N - S_{St}) \quad (3)$$

and for measuring locations 3 and 4 which are not influenced by the magnetic field:

$$U_{43A} = \Delta T_{43}(S_N - S_A) \quad (4)$$

$$U_{43C} = \Delta T_{43}(S_N - S_C) \quad (5)$$

and $U_{43St} = \Delta T_{43}(S_N - S_{St}) \quad (6)$

Inserting Equation (4) in Equation (1) and Equation (5) in Equation (2), obtains:

$$E_{21} = U_{21A} - U_{43A} \cdot \frac{\Delta T_{21}}{\Delta T_{43}} \quad (7)$$

and $$E_{21} = U_{21C} - U_{43C} \cdot \frac{\Delta T_{21}}{\Delta T_{43}} \quad (8)$$

For the embodiment of triple-conductor thermoelements as shown in FIG. 4:

$$E_{21} = U_{21St} - U_{43St} \cdot \frac{\Delta T_{21}}{\Delta T_{43}} \quad (9)$$

The ratio of the temperature differences $\Delta T_{21}/\Delta T_{43}$ can be eliminated from Equations (7) and (8). After several calculation steps, the temperature independent signal voltage is obtained as follows:

$$E_{21} = \frac{U_{21A} - U_{21C}\frac{U_{43A}}{U_{43C}}}{1 - \frac{U_{43A}}{U_{43C}}} \quad (10)$$

Figure 5:
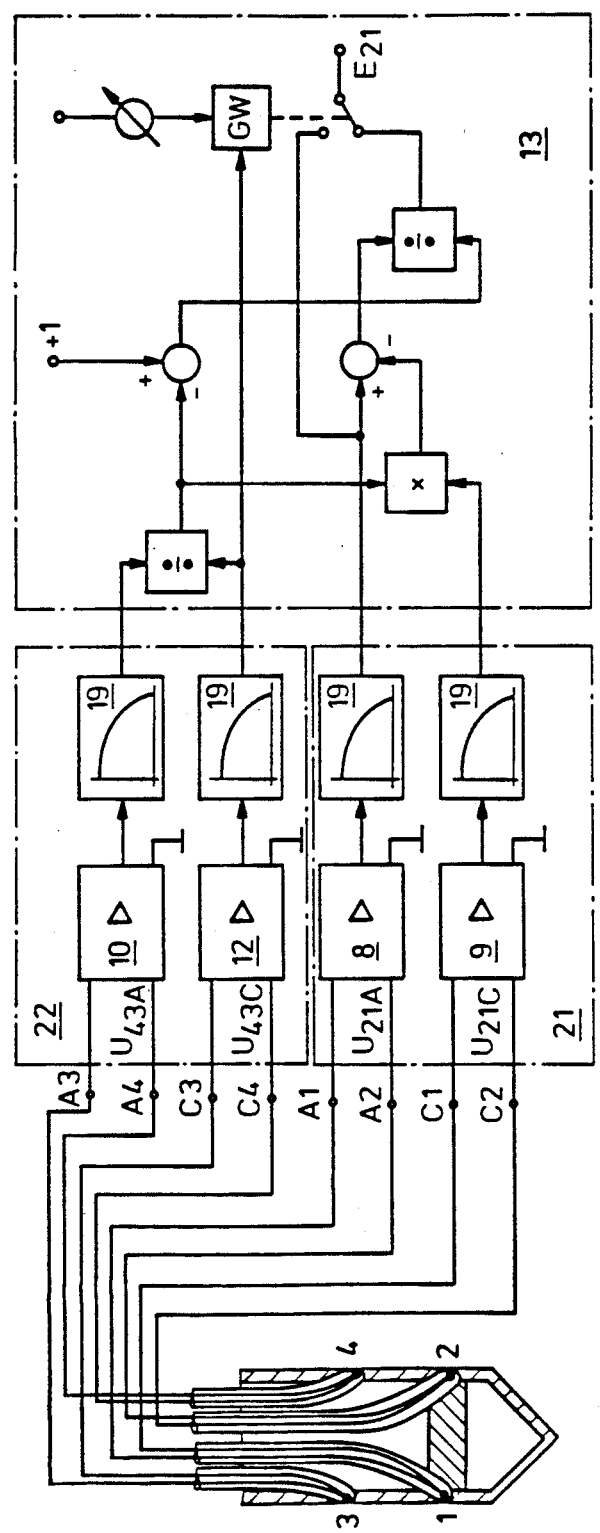
FIG. 5 is a block circuit diagram of an evaluation circuit according to the invention for processing signals detected by the probe shown in FIG. 3.

The four voltages $U_{21A}$, $U_{21C}$, $U_{43A}$ and $U_{43C}$ of probe 5 in the embodiment shown in FIG. 3 represent the measured voltage across terminal $A_1$ and $A_2$, $C_1$ and $C_2$, $A_3$ and $A_4$, and $C_3$ and $C_4$ respectively. By measuring these voltages and solving the equation (10), signal voltage $E_{21}$ is obtained which is a function of velocity only. FIG. 5 is a block circuit diagram of an evaluation circuit 11 for implementing equation (10) and thus processing the measured signals detected by the probe 5 in the embodiment of FIG. 3. This evaluation circuit 11 can be realized with appropriate analog components. However, care must be taken that the amplifiers 8, 9, 10, 12 employed are low in noise and drift. A low-pass filter 19 connected to each of the amplifier outputs is necessary to average the probe signal which fluctuates over time. A time constant of 10 seconds is sufficient for most applications. The temperature difference below which no temperature compensation is necessary can be preselected by means of a limit value (GW).

Evaluation circuit 11, which implements equation (10), comprises amplifier units 21, 22 for amplifying the measured voltages $U_{21A}$, $U_{21C}$, $U_{43A}$, $U_{43C}$ and a signal processing unit 13 for determining the temperature compensated velocity signal $E_{21}$.

The first amplifier unit 21 is connected to the pairs of terminals $A_1$, $A_2$ and $C_1$, $C_2$ associated with thermoelements 50, 60 at points 1, 2 which are in the first region influenced by the magnetic field generated by magnet 6. In particular, a first differential amplifier 8 in the unit 21 amplifies the measured voltage $U_{21A}$ from the first pair of terminals $A_1$, $A_2$ and a second differential amplifier 9 positioned in unit 21 amplifies the measured voltage $U_{21C}$ from the other pair of terminals $C_1$, $C_2$.

The second amplifier unit 22 is connected to the pairs of terminals $A_3$, $A_4$ and $C_3$, $C_4$ associated with thermoelements 70, 80 at location points 3, 4 which are positioned in the second region which is outside the influence of the magnetic field. A third differential amplifier 10 in unit 22 amplifies the measured voltage $U_{43A}$ received from the third pair of terminals $A_3$, $A_4$. A fourth differential amplifier 12, also positioned in unit 22, amplifies the measured voltage $U_{43C}$ received from the fourth pair of terminals $C_3$, $C_4$.

After each of the measured voltages $U_{21C}$, $U_{21A}$, $U_{43C}$, $U_{43A}$ have been filtered by the low-pass filters 19, they are input to the signal processing unit 13 which implements Equation (10) for calculating the temperature independent signal voltage $E_{21}$ corresponding to the velocity of the stream of liquid metal.

The signal processing unit 13 includes analog circuit elements with which the signal $E_{21}$ is calculated. In block 130, the measured voltage $U_{43A}$ is divided by $U_{43C}$. This result F is fed to block 132 which multiplies result F by the measured voltage $U_{21C}$. Also, result F is input to block 134 which subtracts the result F from 1. This output H is the denominator for the Equation (10). The measured voltage $U_{43C}$ is also input into block GW which is the preselected difference below which no temperature compensation is necessary. Thus, the temperature dependent Seeback coefficients for the liquid metal or the electrode material do not have to be introduced into the calculation if $U_{43C}$ is below the preselected value and $E_{21} = U_{21A}$ as determined by Equation (14a) to be discussed.

Block 132 outputs result G which is then fed to block 136. This block 136 also receives the measured signal voltage $U_{21A}$. The result I from block 136 represents the numerator in Equation (10). Both results I, H are fed to block 138 which outputs signal $E_{21}$.

Instead of analog amplifiers and low-pass filter circuitry, high resolution integrating digital voltmeters can be used and these digitalized values can be further processed in a computer. This type of evaluation improves measuring accuracy.

For the case where a temperature gradient of several Kelvin degrees exists between measuring location points 3 and 4, Equation (10) can be employed without difficulty, using the evaluation circuit 11 of FIG. 5. However, if the temperature gradients within the flow are very small (i.e. a temperature difference $\Delta T_{43} < 0.1°$ K.), the evaluation circuit 11 of FIG. 5 implementing Equation (10) becomes inaccurate because the numerator and denominator of the quotient $U_{43A}/U_{43C}$ simultaneously go toward zero. For small changes around a fixed temperature average, measuring voltages $U_{43A}$ and $U_{43C}$ can be considered proportional to one another. Thus, with the introduction of a non-dimensional proportionality constant C*, $$U_{43A} = C^* \cdot U_{43C} \quad (11)$$

This simplifies Equation (10) to $$E_{21} = \frac{U_{21A} - U_{21C} \cdot C^*}{1 - C^*} \quad (12)$$

Now, an evaluation according to Equation (12) is possible if previously C* was determined by experiment with a greater temperature gradient. However, care must be taken that C* is additionally dependent on the absolute temperature.

A further simplification for determination of the signal voltage $E_{21}$ is obtained if the temperature gradient between measuring locations 1 and 2 additionally disappears. In this case, signal voltages $U_{21A}$ and $U_{21C}$ are dependent only on the velocity and are therefore identical.

$$U_{21A}=U_{21C} \text{ for } \Delta T_{12}=0 \tag{13}$$

Thus, Equation (12) changes to relationships which are known for measuring probes without temperature compensation:

$$E_{21}=U_{21A} \tag{14a}$$

and $$E_{21}=U_{21C} \tag{14b}$$

As mentioned, the use of evaluation circuit 11 of FIG. 5 for implementing Equation (10) for small temperature gradients between measuring locations 3 and 4 may produce an inaccurate result. To avoid possible difficulties in determination of the proportionality constant C* for an evaluation according to Equation (12), due to the additional dependence on the absolute temperature of the fluid, a lower limit is set for probe voltage $U_{43C}$, e.g. $U_{43C}=4$ $\mu V$. If the measurement results in values smaller than 4 $\mu V$ for probe voltage $U_{43C}$, an evaluation according to Equation (14a) or (14b) will be made, i.e. without temperature compensation.

The result becomes more accurate, the smaller the temperature gradient at the probe. The lower limit set in block GW determines when an evaluation according to Equation (10) is to be made. This value depends on the flow velocity to be measured, the sensitivity of the probe signal with respect to the flow velocity and on the quality of the temperature measurement. A temperature measuring device of high resolution and accuracy permits the setting of a lower limit as is required by a low flow velocity or a low velocity sensitivity of the probe.

For practical measurements it is therefore advantageous to utilize for evaluation, not the momentary value but, a temperature average which has been formed over a sufficiently long integration period.

Another possibility for determining the temperature independent signal voltage $E_{21}$ is to measure the temperature differences $\Delta T_{21}$ and $\Delta T_{43}$ in addition to two pairs of identical probe voltages in the two measuring planes of either $U_{21A}$, $U_{43A}$ or $U_{21C}$, $U_{43C}$. Each of the discussed evaluations are employed by the probe 5 of FIG. 3 using the block circuit diagram of FIG. 6.

Figure 6:
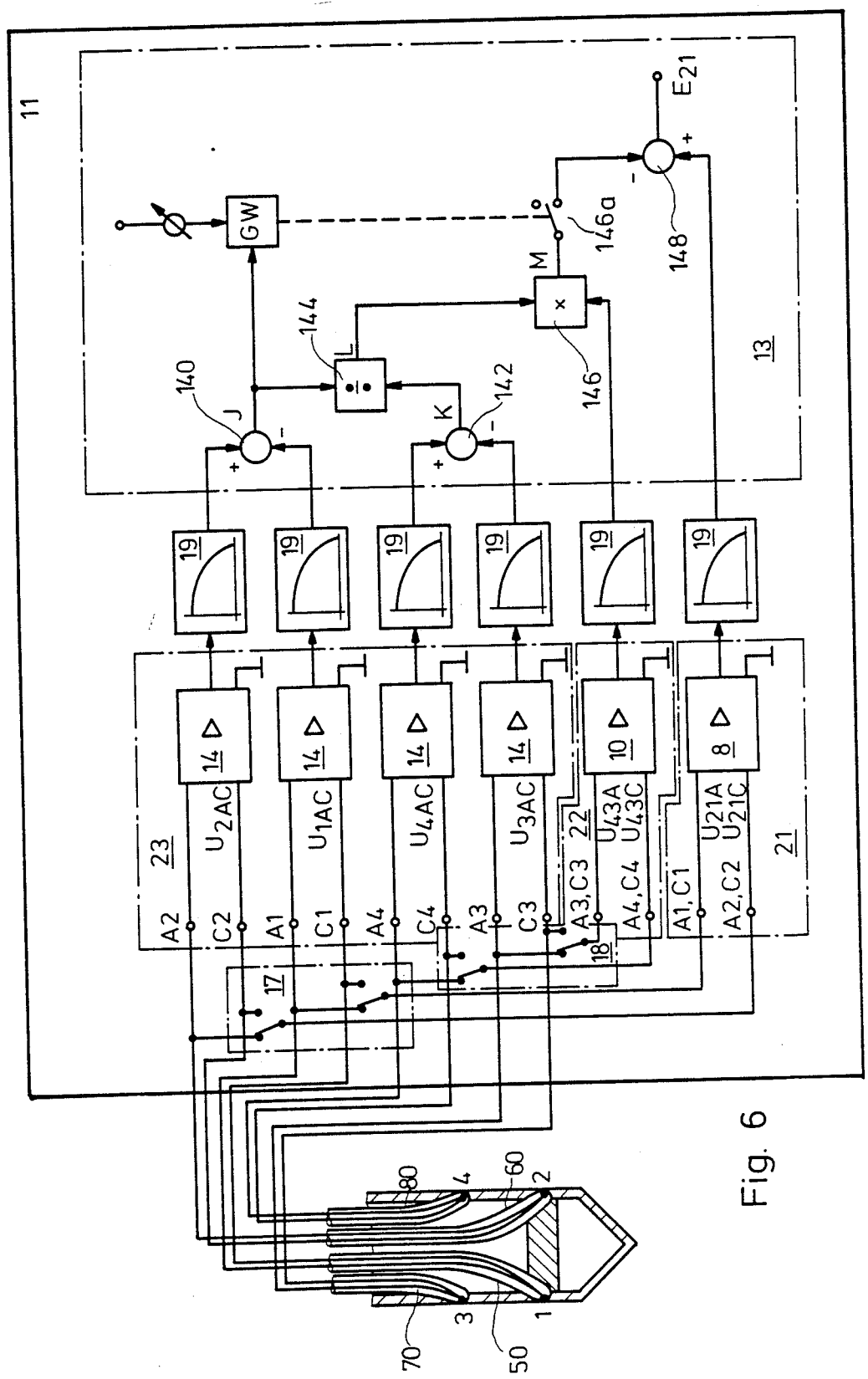
FIG. 6 is another block circuit diagram of an evaluation circuit according to the invention for processing signals detected by the probe shown in FIG. 3.
Figure 7:
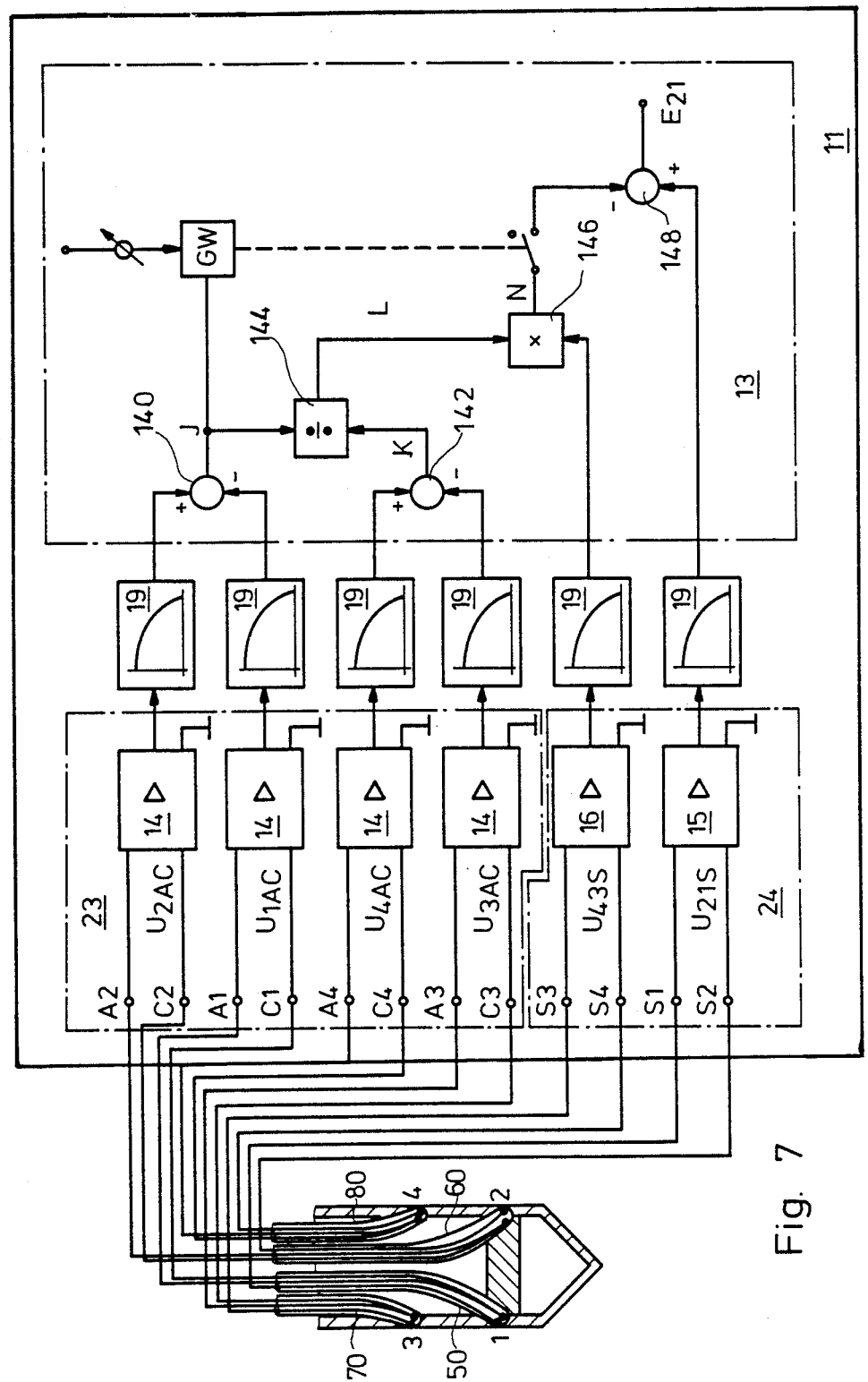
FIG. 7 is a block circuit diagram of an evaluation circuit according to the invention for processing signals detected by the probe shown in FIG. 4.

The following applies for the temperature differences at measuring location points 2, 1 and 4, 3, respectively, as shown in FIGS. 6 and 7 wherein $U_{1/2/3/4\ AC}$ is the thermovoltage of the measuring location produced in amplifier unit 23 and measured from each measuring tip wherein measuring tip 56 will have a thermovoltage from either terminals $A_1$ or $C_1$, measuring tip 66 will have a thermovoltage from either terminals $A_2$ or $C_2$, measuring tip 76 will have a thermovoltage from either terminals $A_3$ or $C_3$, and measuring tip 86 will have a thermovoltage from either $A_4$ or $C_4$. Accordingly, $$T_{21}=(U_{2AC}-U_{1AC}) \tag{15a}$$

and $$T_{43}=(U_{4AC}-U_{3AC}) \tag{15b}$$

And for the ratio of the two temperature differences:

$$\frac{\Delta T_{21}}{\Delta T_{43}} = \frac{U_{2AC} - U_{1AC}}{U_{4AC} - U_{3AC}} \tag{16}$$

Inserting Equation (16) into Equations (7) and (8) provides the following relationships:

$$E_{21} = U_{21A} - U_{43A} \cdot \frac{U_{2AC} - U_{1AC}}{U_{4AC} - U_{3AC}} \tag{17}$$

$$E_{21} = U_{21C} - U_{43C} \cdot \frac{U_{2AC} - U_{1AC}}{U_{4AC} - U_{3AC}} \tag{18}$$

and for the embodiment employing triple-conductor thermoelements as shown in FIG. 7:

$$E_{21} = U_{21St} - U_{43St} \cdot \frac{U_{2AC} - U_{1AC}}{U_{4AC} - U_{3AC}} \tag{19}$$

In Equations (17) to (19), the probe measured voltages in measuring plane 43 ($U_{43A}$, $U_{43C}$, $U_{43St}$) as well as the numerator and denominator of the quotient go toward zero for decreasing temperature gradients. For probe measured voltages which are proportional to the temperature gradients in measuring plane 43, the following applies:

$$U_{43A} \cdot C_{St} = k_A \cdot C_{St} \cdot (U_{4AC} - U_{3AC}) \tag{20}$$

The proportionality factors $k_A$, $k_C$ or $k_{St}$ can be determined by calibration, but are also a function of the absolute temperature, as is constant C* in Equation (11). Therefore, the manner of proceeding mentioned in connection with Equations (10) and (12) for measurements applies here as well.

Referring to FIG. 6, evaluation circuit 11 is equipped with amplifier units 21, 22, and 23 for amplifying the measured voltages $U_{21A}$, $U_{21C}$, $U_{43A}$, $U_{43C}$, and the thermovoltages $U_{2AC}$, $U_{1AC}$, $U_{4AC}$, $U_{3AC}$, respectfully, from the location points 1, 2 and 3, 4. A signal processing unit 13 determines the temperature compensated velocity signal $E_{21}$ by implementing the Equations.

The third amplifier unit 23 associated with the terminals from location points 1, 2 and 3, 4 is provided with a plurality of differential amplifiers 14 for each one of the thermovoltages $U_{1AC}$, $U_{2AC}$, $U_{3AC}$, $U_{4AC}$. As stated previously these thermovoltages are measured from each measuring tip wherein measuring tip 56 will have a thermovoltage from either terminals $A_1$ or $C_1$, measuring tip 66 will have a thermovoltage from either terminals $A_2$ or $C_2$, measuring tip 76 will have a thermovoltage from either terminals $A_3$ or $C_3$, and measuring tip 86 will have a thermovoltage from either $A_4$ or $C_4$.

The first amplifier unit 21 is associated with two pairs of terminals receiving signals from location points 1, 2 which are positioned in the first region that is influenced by the magnetic field. The unit 21 is provided with a first differential amplifier 8 whose input receives, by means of a first switching unit 17, either the measured signal voltage $U_{21A}$ of the one pair terminals $A_1$, $A_2$ or the measured signal voltage $U_{21C}$ of the terminals $C_1$, $C_2$. The second amplifier unit 22 associated with the location points 3, 4 positioned in the second region that is away from the influence of the magnetic field is provided with a third differential amplifier 10. The third differential amplifier has an input connected, by means of a second switching unit 18, either to the measured voltage $U_{43A}$ of the pair of terminals $A_3$, $A_4$ or to the measured voltage $U_{43C}$ of the other pair of terminals $C_3$, $C_4$. Switch means 17, 18 are used to more accurately determine the temperature compensation signal $E_{21}$. The switches 17, 18 allow the setting of the amplifier units 21, 22 to receive a voltage signal based on the material of the electrode, whether it be Alumel or Cromel, and the elimination of the temperature compensation.

The signal processing unit 13 includes analog circuit elements with which the signal $E_{21}$ which is proportional to the velocity is determined by linking the amplified measured voltages of the terminals from the location points 1, 2 and 3, 4. At block 140, if the result J is equal to zero, block GW opens a switch 146a to allow block 148 to receive result M. Accordingly, the circuit 13 immediately solves Equation (14a) or (14b) and provides a value for $E_{21}$.

In the alternative, if the output of block 140 is not zero, result J is the numerator for the Equations (17) or (18) and result J is sent to block 144 as well as block GW which closes switch 146a and connects the output M of block 146 to block 148. At block 142, the denominator is found and provided to block 144. The result L is sent to block 146, where the result M is calculated and sent to block 148 for determination of the signal $E_{21}$.

If in addition to the stated temperature differences $T_{21}$ and $T_{43}$, the probe voltages $U_{21St}$ and $U_{43St}$ are also measured then an embodiment such as shown in FIG. 7 with the probe of FIG. 4 is used wherein the evaluation circuit 11 for the inductive flow probe 5 is equipped with amplifier units 23, 24 for amplifying the measured voltages from location points 1, 2 and 3, 4 and a signal processing unit 13 for determining the temperature compensated velocity signal $E_{21}$. The amplifier unit 23 associated with the location points 1, 2, 3, 4 is provided with a differential amplifier 14 for each one of the thermovoltages $U_{1AC}$, $U_{2AC}$, $U_{3AC}$, $U_{4AC}$. As previously stated, these thermovoltages are measured from each measuring tip wherein measuring tip 56 will have a thermovoltage from either terminals $A_1$ or $C_1$, measuring tip 66 will have a thermovoltage from either terminals $A_2$ or $C_2$, measuring tip 76 will have a thermovoltage from either terminals $A_3$ or $C_3$, and measuring tip 86 will have a thermovoltage from either $A_4$ or $C_4$.

The amplifier unit 24 is equipped with a fifth differential amplifier 15 for amplifying the measured potential difference $U_{21St}$ in the first region of the thermoelements connected at location points 1, 2 which are exposed to the magnetic field. A sixth differential amplifier 16 measures the potential difference $U_{43St}$ in the second region of the thermoelements connected to the pair of terminals $S_{t3}$, $S_{t4}$ receiving signals from location points 3, 4 which are away from the influence of the magnetic field. The signal processing unit 13 includes analog switching elements similar to those in FIG. 6 with which the signal $E_{21}$ proportional to the velocity is determined. The signal $E_{21}$ is obtained by using the amplified thermovoltages $U_{1AC}$, $U_{2AC}$, $U_{3AC}$, $U_{4AC}$ and calculating Equations (17), (18) whereas the potential differences $U_{21St}$, $U_{43St}$ are used to calculate Equation (19).

An advantage of the probe 5 in the embodiment of FIG. 3 is that if Cromel/Alumel thermoelements having grounded measuring tips are employed, the location of the potential pickup and of the temperature measurement coincide. However, this type of structure has the drawback in that the penetration of liquid metal into the measuring tip, and thus a displacement of the actual measuring location, cannot be detected. This could falsify the measuring result without being detectable.

This disadvantage is overcome by probe 5 in the embodiment of FIG. 4 since measuring the insulation resistance at the temperature measuring location point makes it easier to detect the penetration of liquid metal. However, in this embodiment, the measuring location points for the electrical potential and the temperature measuring location points are spatially separated which may possibly have an adverse influence on measuring accuracy. Moreover, in the embodiment according to FIG. 4, only one measuring electrode is available at each thermoelement location. Therefore, although the probe embodiment according to FIG. 3 has a lower number of electrode leads, it is more redundant than the embodiment according to FIG. 4 with respect to a measurement of superposed probe signals (velocity+temperature).

Figure 8:
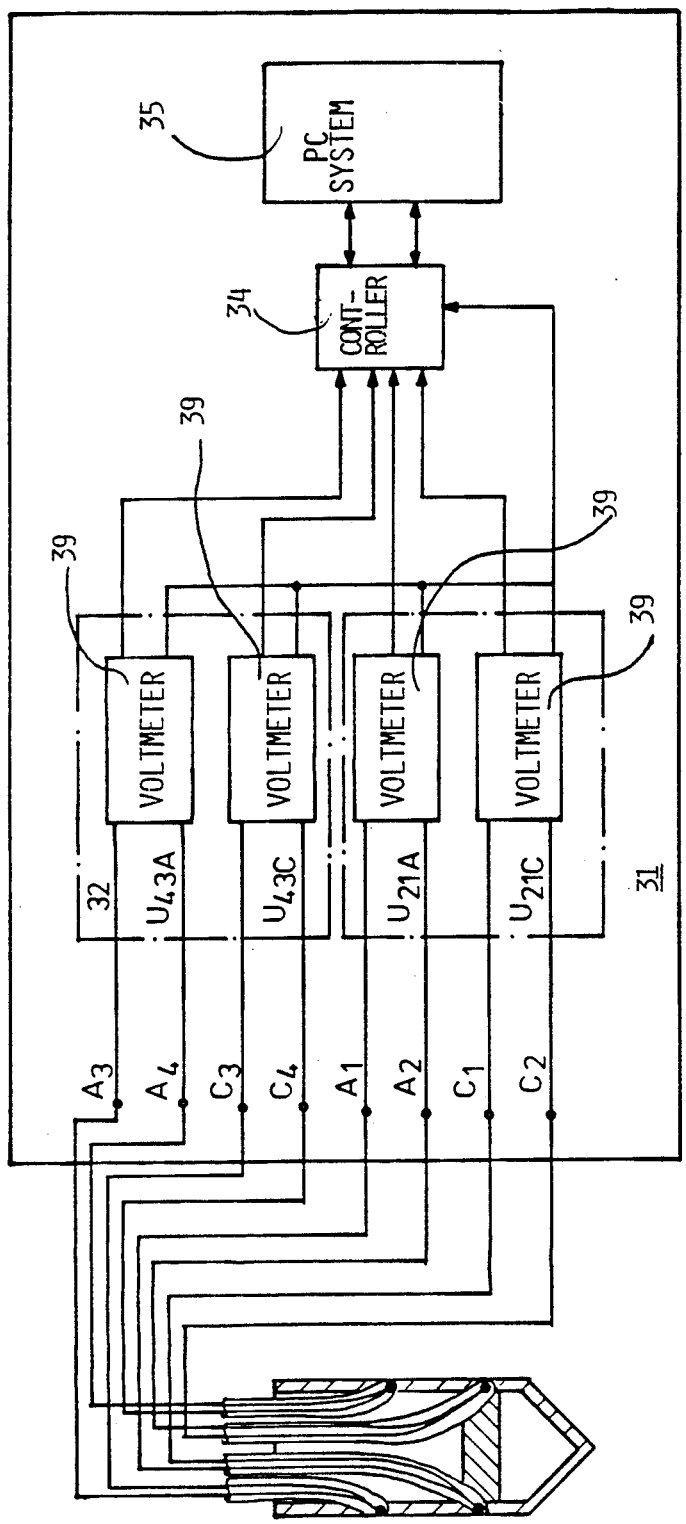
FIG. 8 is a block circuit diagram of an evaluation circuit according to the invention for digital and computational processing signals detected by the probe shown in FIG. 3.

FIG. 8 is a block circuit diagram of a computer added evaluation circuit for inplementing equation (10). This evaluation circuit can be realized with appropriate components. However, care must be taken that the nano-voltmeters 39 employed have good sensitivity. The output of the nano-voltmeters are connected to an IEC-bus-controller 3 which is linked to a PC-system 35 for determination of the compensated velocity signal $E_2$, by implementing the equations.

Figure 9:
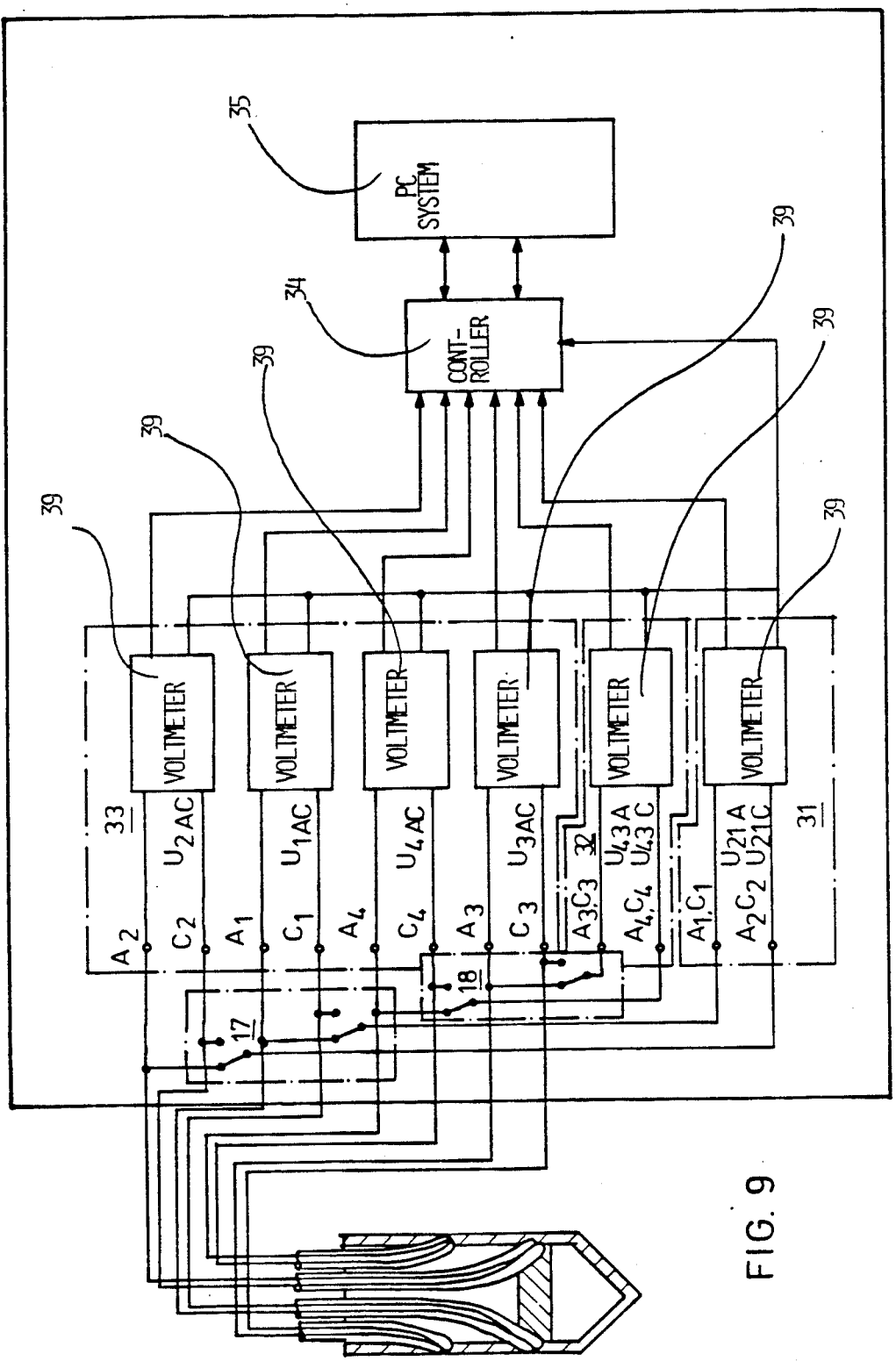
FIG. 9 is another block circuit diagram of an evaluation circuit according to the invention for digital and computational processing signals detected by the probe shown in FIG. 3.

Referring to FIG. 9, evaluation circuit 12 is equipped with nanovoltmeter units 31, 32 and 33 for converting the measured voltages $U_{21A}$, $U_{21C}$, $U_{43A}$, $U_{43C}$, and the thermovoltages $U_{2AC}$, $U_{1AC}$, $U_{4AC}$, $U_{3AC}$, respectfully from the location points 1, 2 and 3, 4 into digital signals. The digitized output of the nano-voltmeter units is connected to an IEC-bus controller 34 which is linked to a PC-system 35 for computational determination of the compensated velocity signal $E_{21}$.

Figure 10:
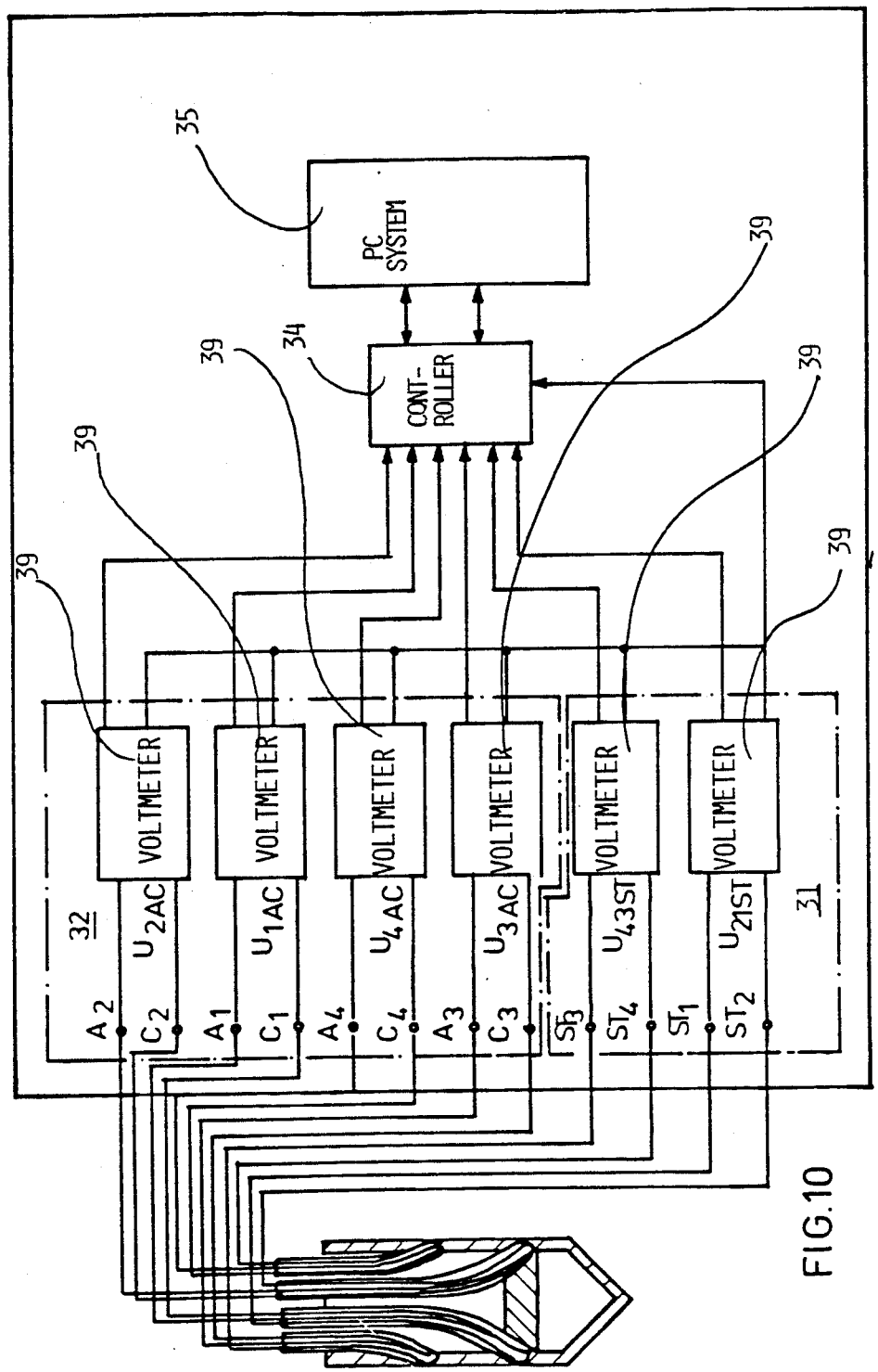
FIG. 10 is a block circuit diagram of an evaluation circuit according to the invention for digital and computational processing signals detected by the probe shown in FIG. 4.

FIG. 10 shows the connection of the probe of FIG. 4 to the circuitry similar to that of FIG. 8 and FIG. 9.

Figure 11:
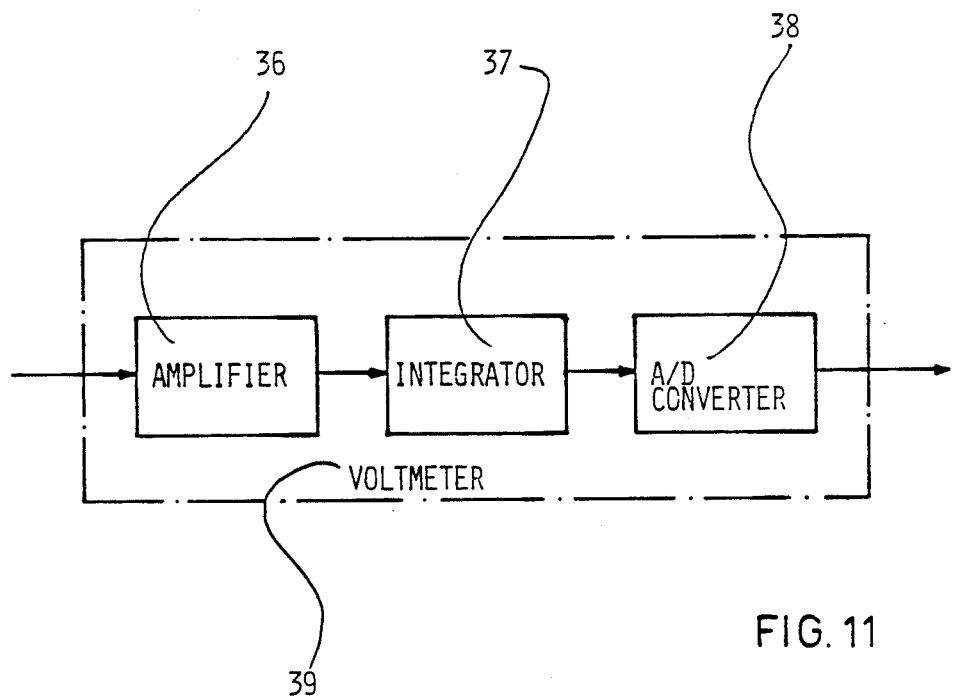
FIG. 11 is a block circuit diagram of a nano-voltmeter used for converting signals detected by the probe shown in FIG. 3 and FIG. 4 respectively.

FIG. 11 is a block diagram which shows the basic composition of the nano-voltmeter 39. At first the amplifier 36 amplifies the input signal. After that the signal will be integrated in the integrator 37 (low pass filter). The integrated signal will finally be converted into an adequate digital (AID) signal in the analog digital converter 38.

The present disclosure relates to subject matter contained in German patent application No. P 37 34 912.0 (filed Oct. 15, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. An inductive flow probe for inductively measuring the flow velocity of a stream of liquid metal by insertion of said probe into the stream, said probe including a probe tube having first and second regions therein, at least one permanent magnet disposed in said first region for providing a magnetic field having a direction substantially transverse to the direction of flow of the stream, and a fist pair of thermoelements positioned in said first region within said magnetic field for measuring and generating a first pair of signals corresponding to a first pair of potentials induced jointly by the flow of the stream and by a first temperature detected in a first part of the stream, wherein the improvement comprises:
- at least a second pair of thermoelements positioned in said second region outside said magnetic field for measuring and generating a second pair of signals corresponding to a second pair of potentials induced by a second temperature detected in a second part of the stream; and
- an evaluation circuit coupled to said first and second pairs of thermoelements for receiving said first and second pairs of signals, said evaluation circuit comparing the first and second pairs of signals for generating a third temperature-compensated signal corresponding to the velocity of the stream of liquid metal.

2. An inductive flow probe as claimed in claim 1 wherein each of said thermoelements has a measuring head fixed to said probe tube, and wherein each of said heads has first and second leads connected thereto.

3. An inductive flow probe as claimed in claim 2 which further comprises a steel wire electrically conductively attached to each of said measuring heads and to a potential terminal, said steel wires being used to measure the electrical potential in the regions adjacent each of said heads.

4. An inductive flow probe as claimed in claim 2 wherein said first and second leads are connected respectively to Cromel and Alumel portions of each of said heads.

5. An inductive flow probe as claimed in claim 2 wherein said first pair of thermoelements consists of first and second thermoelements each having first and second terminals connected to the first and second leads thereof, and wherein said second pair of thermoelements consists of third and fourth thermoelements each having first and second terminals connected to the leads thereof.

6. An inductive flow probe as claimed in claim 5 wherein said evaluation circuit comprises;
- a first differential amplifier for amplifying a voltage generated between the first terminals of said first and second thermoelements;
- a second differential amplifier for amplifying a voltage generated between the second terminals of said first and second thermoelements;
- a third differential amplifier for amplifying a voltage generated between the first terminals of said third and fourth thermoelements;
- a fourth differential amplifier for amplifying a voltage generated between the second terminals of said third and fourth thermoelements; and
- a signal processing unit coupled to the outputs of said first, second, third and fourth differential amplifiers for determining from said amplified voltages said temperature-compensated velocity signal.

7. An inductive flow probe as claimed in claim 5 wherein said evaluation circuit comprises;
- a first differential amplifier;
- a first switching means for selectively coupling one of a voltage generated between the second terminals of said first and second thermoelements and a voltage generated between the first terminals of said first and second thermoelements across the input of said first differential amplifier for the amplification thereof;
- a second differential amplifier;
- a second switching means for selectively coupling one of a voltage generated between the second terminals of said third and fourth thermoelements and a voltage generated between the first terminals of said third and fourth thermoelements across the input of said second differential amplifier for the amplification thereof;
- a third differential amplifier for amplifying a voltage generated between the first and second terminals of said third thermoelement;
- a fourth differential amplifier for amplifying a voltage generated between the first and second terminals of said fourth thermoelement;
- a fifth differential amplifier for amplifying a voltage generated between the first and second terminals of said first thermoelement;
- a sixth differential amplifier for amplifying a voltage generated between the first and second terminals of said second thermoelement; and
- a signal processing unit coupled to the outputs of said first, second, third, fourth, fifth and sixth differential amplifiers for determining from said amplified voltages said temperature-compensated velocity signal.

8. An inductive flow probe as claimed in claim 3 wherein said first pair of thermoelements consists of first and second thermoelements each having first and second terminals connected to the first and second leads thereof, and wherein said second pair of thermoelements consists of third and fourth thermoelements each having first and second terminals connected to the leads thereof.

9. An inductive flow probe as claimed in claim 8 wherein said evaluation circuit comprises;
- a first differential amplifier for amplifying a voltage generated between the potential terminals of said first and second thermoelements;
- a second differential amplifier for amplifying a voltage generated between the potential terminals of said third and fourth thermoelements;
- a third differential amplifier for amplifying a voltage generated between the first and second terminals of said third thermoelement;
- a fourth differential amplifier for amplifying a voltage generated between the first and second terminals of said fourth thermoelement;
- a fifth differential amplifier for amplifying a voltage generated between the first and second terminals of said first thermoelement;
- a sixth differential amplifier for amplifying a voltage generated between the first and second terminals of said second thermoelement; and
- a signal processing unit coupled to the outputs of said first, second, third, fourth, fifth and sixth differential amplifiers for determining from said amplified voltages said temperature-compensated velocity signal.

10. An inductive flow probe as claimed in claim 6, wherein said evaluation circuit further comprises a low-pass filter interposed between the output of each of said differential amplifiers and said signal processing unit.

11. An inductive flow probe as claimed in claim 7, wherein said evaluation circuit further comprises a low-pass filter interposed between the output of each of said differential amplifiers and said signal processing unit.

12. An inductive flow probe as claimed in claim 9, wherein said evaluation circuit further comprises a low-pass filter interposed between the output of each of said differential amplifiers and said signal processing unit.

* * * * *